UNITED STATES PATENT OFFICE.

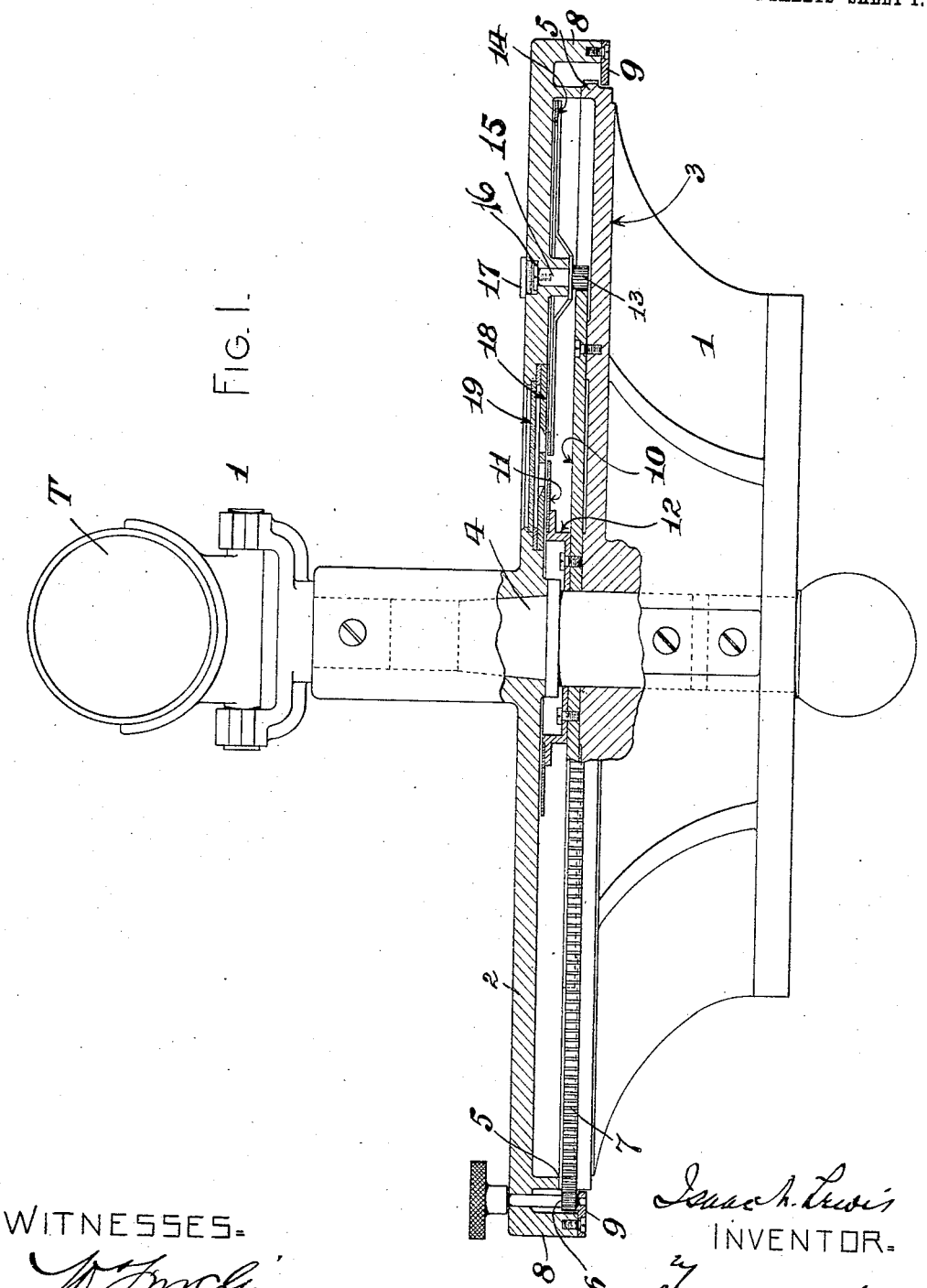

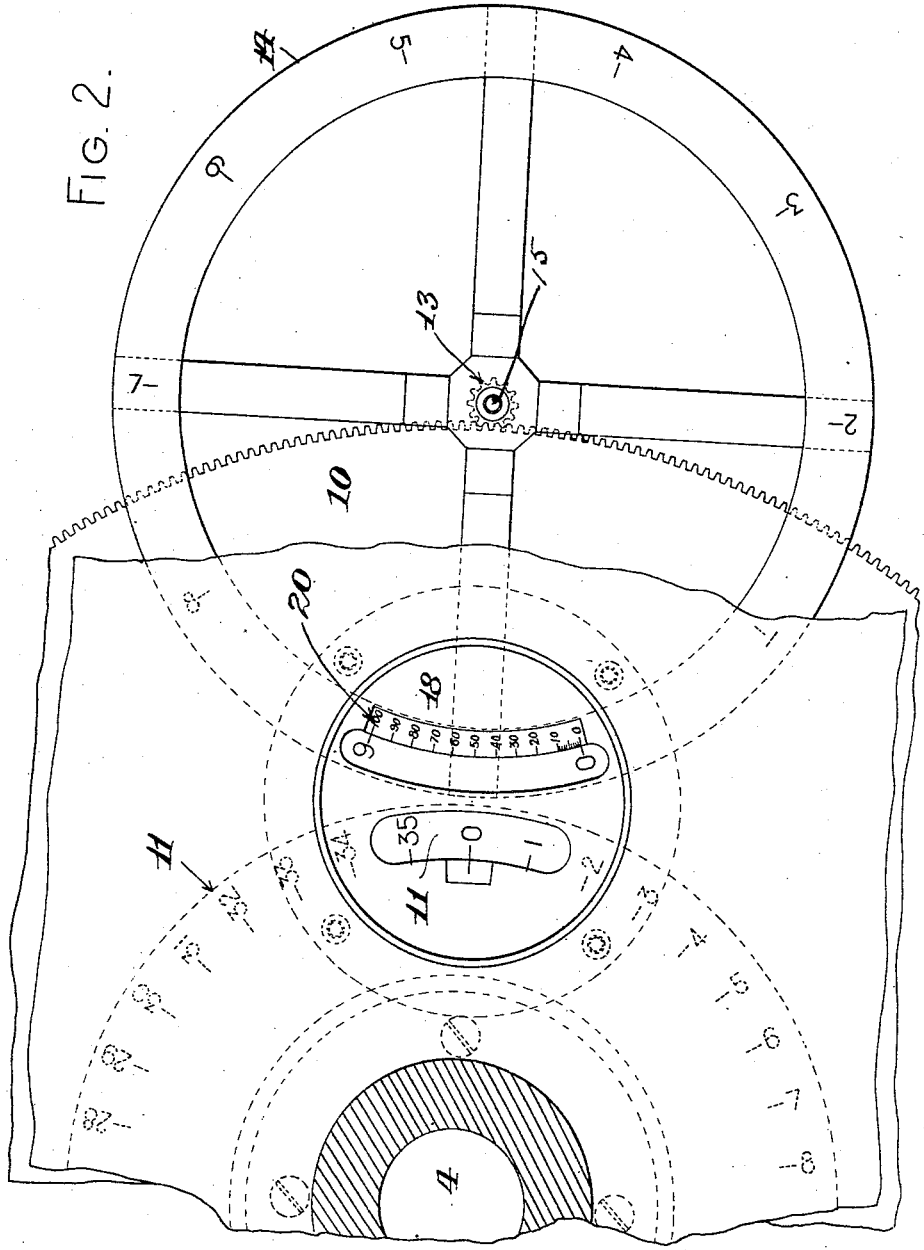

ISAAC N. LEWIS, OF THE UNITED STATES ARMY, ASSIGNOR TO ALBERT W. ERDMAN, OF WATERBURY, CONNECTICUT.

AZIMUTH-INDICATOR.

943,751. Specification of Letters Patent. Patented Dec. 21, 1909.

Application filed June 6, 1908. Serial No. 437,054.

*To all whom it may concern:*

Be it known that I, ISAAC N. LEWIS, of the United States Artillery, have invented certain new and useful Improvements in Azimuth-Indicators, of which the following is a full specification.

The invention is a device for indicating the azimuth bearing of telescopes and similar instruments, and aims to provide a planetary dial system for that purpose, capable of operation with rapidity, and of measuring and indicating angular values with extreme precision.

The invention involves the structure and relationship of the several parts, as below explained and more particularly pointed out in the claims.

Figure 1 is a side elevation, partly in vertical central section, of a telescope and mounting embodying my invention; and Fig. 2 is an enlarged plan of the dials and gearing with parts broken away and shown in section.

Referring to Fig. 1, T represents, in end view, a telescope carried by horizontal trunnions 1, on a rotary table 2, which is mounted to rotate on a fixed base 3. The indicator of this invention measures the rotary movement and indicates the various angular positions of the table and telescope with respect to the fixed base and when the latter is fixed in a horizontal position, and oriented, becomes an indicator of the azimuth of the telescope. The table pivots on the conical head and shoulder of a central post or plug 4 and is supported at or near its periphery upon an annular track or slide 5, which incloses the space beneath the table. Rotary movement is imparted to the table by a thumb-pinion 6 journaled in it and meshing with an annular rack 7 fixed on the base; and the pinion and rack, as well as the track 5, is inclosed and protected by the depending skirt 8 of the table and the cover plate 9, fastened to the skirt, which serves to hold the table to the base.

The mechanism of the indicator is inclosed within the space or chamber between the table and base and comprises a sun-gear 10 and a main dial 11, both fixed to the base concentrically with the rotary axis of the table. As shown herein, the dial is a flat annulus, bearing a scale of angular measurement and held up closely beneath the table by an annular bracket 12, which is fastened to the top of the gear. The fixed sun-gear meshes with a planetary pinion 13 which is carried by the rotary table and supports or actuates a planetary dial 14, the latter being located in the same plane as the fixed dial and nearly tangent to it. The planetary dial may also be a flat annulus, bearing a scale of equal parts, and is connected to the pinion by a four-arm spider, while the pinion itself is formed on or carried by a small stud 15, journaled in a tubular depending boss of the table and held therein by the head of a screw 16, which latter is seated in a countersink in the top surface of the table and covered by a screw-plug 17 threaded into the countersink. The rotary table is fenestrated above the two dials so as to expose to view proximate portions of the scales thereof, and in the present case such fenestration is provided by a plate 18 let into a countersunk aperture in the table, and formed with two adjacent arcuate slots constituting windows for the respective dials, which windows are covered by a pane of glass 19, also within the countersunk recess.

The main dial and the planetary angle indicating member are coördinated by the arrangement of their gearing so that the planetary member makes a complete revolution as the table is rotated over one of the divisions of its fixed scale, and thus the subdivisions of the scale of said planetary member, as displayed through its windows, indicate the fractions of the divisions of the main scale. In the present instance the divisions of the main scale represent tens of degrees, as shown by Fig. 2, and the divisions of the scale of the planetary dial, consisting of ten equal spaces, represent tenths thereof, *i. e.* single degrees, so that the reading of the figures appearing in the two windows gives the azimuth in degrees. The window for the planetary dial is of sufficient arcuate length to expose at least one whole division thereof, representing a single degree, and the reference index for said scale consists of a small arcuate scale 20 equal in length to said single division and divided into say one hundred equal subdivisions, so that the reference scale thus represents fractions of the planetary scale divisions, *i. e.* hundredths of degrees. The reference scale is preferably fixed to or marked directly on the margin of the window so that an even number of degrees will be indicated when one of the planetary division marks registers with the zero, or end, mark of the reference scale and the distance of the division mark of the planetary scale from the said zero mark, as measured along the said reference scale, gives the azimuth readings down to hundredths of degrees without further manipulation. Thus the relative rotation that takes place between the two dials as the telescope is brought to bear on the desired object, causes to be displayed through one window the tens of degrees, and through the other the single degrees, while in the latter window the position of the degree figure index with respect to the reference scale therefor gives the fractions; the whole constituting the azimuth of the object sighted, to hundredths of a degree.

It will be observed that the relative diameters of the two dials are such that the divisions of the planetary dial may be of considerable arcuate length and somewhat longer than the divisions of the main dial, which allows the graduations of the reference scale to be comparatively coarse and hence adapted for hasty inspection. The graduations of the two dials, however, may be of other relative values than those herein described, without departing from the substance of the invention.

Having described my invention, what I claim and desire to secure by United States Letters Patent, is:—

Claims:

1. In an azimuth indicator, two coördinated and relatively rotary dials respectively bearing scales of angular measurement, and a table or casing fenestrated to expose portions of said scales therethrough, in combination with a reference device adjacent to the exposed portion of one of said dial scales, consisting of a scale representing fractions of the divisions of said dial scale.

2. In an azimuth indicator, a fixed dial and a rotary table concentric therewith, in combination with a planetary dial carried by said table and coördinated with said fixed dial to indicate fractions of the divisions thereof and a reference device for said planetary dial consisting of a scale indicating fractions of the divisions thereof.

3. In an azimuth indicator, a base having a sun-gear and a main dial fixed thereto, a rotary table on said base, a pinion carried thereby in mesh with said gear and a planetary dial actuated by said pinion, the divisions of said planetary dial representing fractions of the divisions of said main dial, in combination with a reference index for said planetary dial fixed to the table and consisting of a scale indicating fractions of the divisions of said planetary scale.

4. In an azimuth indicator, the combination with a rotary table of two relatively rotary dials disposed in the same plane beneath said table and coördinated to indicate the angular position thereof, said table being fenestrated above the proximate portions of said two dials.

5. In an azimuth indicator, a fixed dial, and a fixed sun-gear, in combination with a planetary dial operated thereby and disposed in substantially the same plane as said fixed dial, said planetary dial bearing a scale representing fractions of the divisions of said fixed dial and the divisions of said planetary scale being of greater arcuate length than the divisions of which they represent fractions.

6. In an azimuth indicator, a base, a sun-gear fixed thereto, and a rotary table on said base concentric with said gear, in combination with a main dial formed as an annulus, an annular bracket supporting said annulus and a rotary planetary member adapted to indicate fractional values of said main dial.

7. In an azimuth indicator, a fixed base and rotary table thereon respectively provided with peripheral track portions inclosing the space between them, in combination with a concentric gear fixed within said inclosed space, a planetary pinion therefor and a planetary angle indicating member actuated by said pinion.

8. In an azimuth indicator, a base, and a table rotary thereon, fenestrated with two adjacent arcuate windows, in combination with two relatively rotary angle-indicating dials disposed in the same plane and adapted to display portions of their scales respectively through said windows.

9. In an azimuth indicator, the combination of a base bearing a sun-gear and a main dial fixed thereto, with a planetary dial actuated by said sun-gear, the said main dial being graduated to divisions representing numbers of degrees and the planetary dial to fractions thereof representing single degrees, and both said dials being disposed in the same plane.

10. In an azimuth indicator, the combination of a base bearing a concentric gear and main dial fixed thereto, with a planetary dial actuated by said gear, said main dial being graduated to divisions representing tens of degrees and said planetary dial to divisions representing single degrees, and means for measuring fractions of the divisions of said planetary dial.

In testimony whereof, I have signed my name to the specification in the presence of two subscribing witnesses.

ISAAC N. LEWIS.

Witnesses:
H. H. KIMBERLY,
R. C. WINNE.